United States Patent [19]

Bowles et al.

[11] Patent Number: 4,738,814
[45] Date of Patent: Apr. 19, 1988

[54] MOLDING PROCESS

[75] Inventors: Patrick J. Bowles; Lloyd W. Garrett; John V. Howard; Robert F. Heil, Sr., all of Louisville, Ky.

[73] Assignee: General Electric Company, Louisville, Ky.

[21] Appl. No.: 917,697

[22] Filed: Oct. 10, 1986

Related U.S. Application Data

[62] Division of Ser. No. 797,686, Nov. 13, 1985, Pat. No. 4,643,663.

[51] Int. Cl.⁴ .................. B29C 33/10; B29C 33/20; B29C 43/06; B29C 43/10
[52] U.S. Cl. .................. 264/297.5; 264/297.6; 264/297.7; 264/316; 264/325; 264/347; 264/DIG. 59; 425/812
[58] Field of Search ............... 264/297.5, 297.6, 297.7, 264/325, 347, DIG. 46, 120, 316, DIG. 59; 425/405 R, 406, 407, 411, 420, 450.1, 451.9, 812, DIG. 44, DIG. 201

[56] References Cited

U.S. PATENT DOCUMENTS

| | | | |
|---|---|---|---|
| 2,485,452 | 10/1949 | Lyijynen | 425/420 |
| 2,921,355 | 1/1960 | Gould et al. | 425/411 X |
| 3,809,739 | 5/1974 | Gelin | 264/297.6 |
| 3,827,848 | 8/1974 | Massonnet | 425/406 |
| 3,850,559 | 11/1974 | Mintz et al. | 425/DIG. 44 |
| 4,008,990 | 2/1977 | Hiemer et al. | 425/812 |
| 4,146,600 | 3/1979 | Elly et al. | 264/39 |
| 4,240,780 | 12/1980 | Carcey | 425/407 |
| 4,318,682 | 3/1982 | Larson et al. | 425/411 |
| 4,457,684 | 7/1984 | Gram | 425/451.9 |
| 4,643,663 | 2/1987 | Bowles et al. | 425/406 |

Primary Examiner—Jeffery Thurlow
Assistant Examiner—Leo B. Tentoni
Attorney, Agent, or Firm—Frederick P. Weidner; Radford M. Reams

[57] ABSTRACT

A process and apparatus for molding a plurality of articles of hardenable material such as plastic which requires each article to be maintained under heat and pressure for a cure interval. A molding press is utilized wherein there is placed a first open mold assembly having spaced die halves between supporting mold platens. At least one of the die halves has a resilient pressure pad between the die and the mold platen supporting the die half. The press is closed to maintain the mold platens in a first force applying position having a slight gap between the die halves and locking the platens in the first position. The mold assembly is removed while in its first locked position from the press and gas from the curing material is evacuated through the gap between the die halves while heating the material. The mold assembly in its first locked position is again placed in the press and the press is closed to unlock the mold assembly and apply and maintain a second molding force greater than the first molding force and sufficient to completely close the die halves to a second position for curing the material and compress the resilient pressure pad. The mold platens are locked in the second position whereby the pressure pad will apply internal forces against the dies to maintain the correct curing pressure in the event of shrinkage of the cured material. The mold assembly is removed from the press in its second locked position and the material is cured under pressure and at elevated temperatures for the correct time interval to form the article. Finally, the mold assembly is unlocked and the article is removed therefrom.

3 Claims, 6 Drawing Sheets

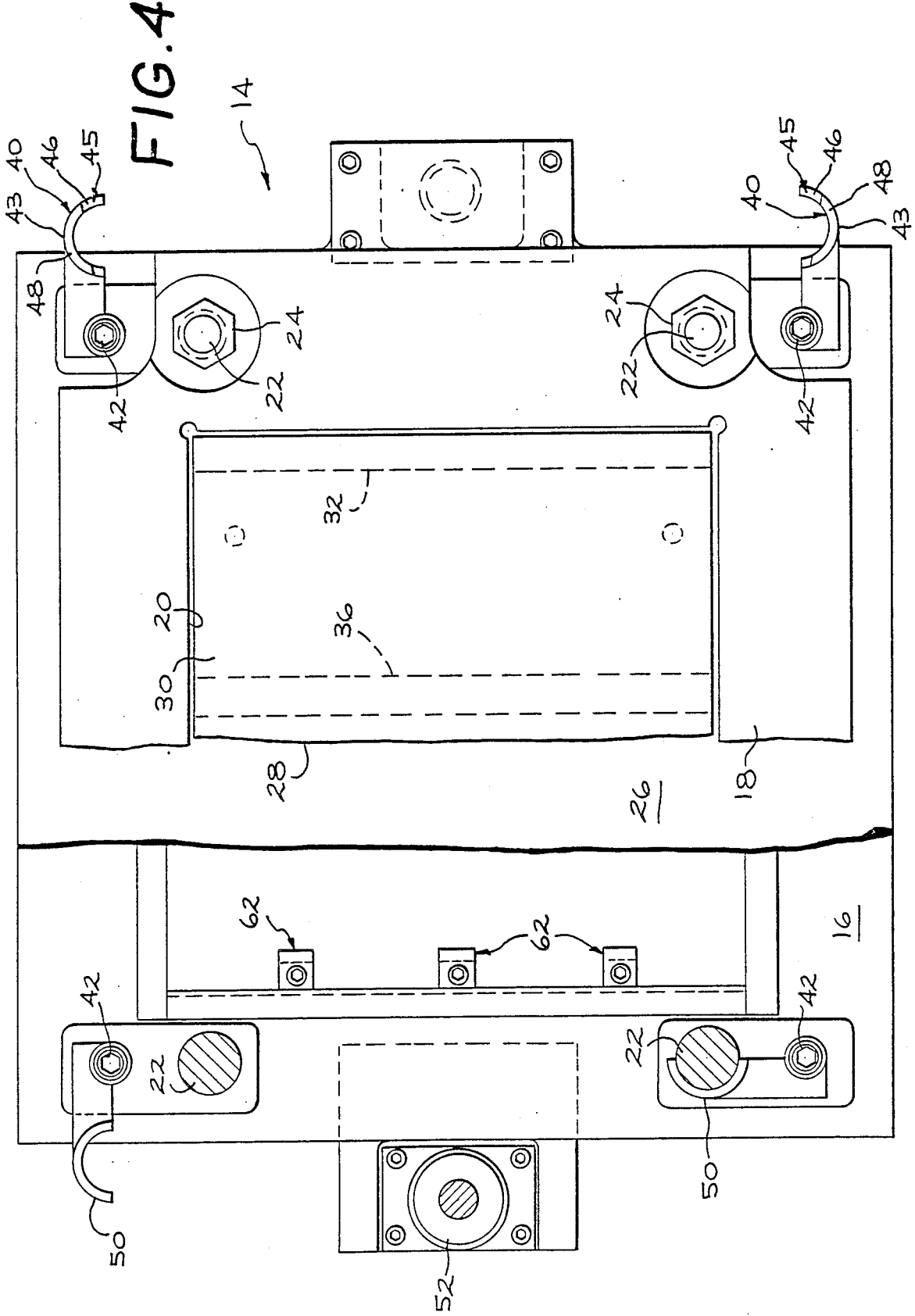

MOLDING PROCESS

This is a division of application Ser. No. 797,686, filed Nov. 13, 1985, now U.S. Pat. No. 4,643,663.

BACKGROUND OF THE INVENTION

This invention relates to the process of manufacture of molded plastic articles and apparatus to accomplish the process and more particularly to improvement in the process and apparatus for molding or forming under heat and pressure materials containing plastic substances which require a relatively high molding force and in which the molding material must remain under compression and heat for a predetermined cure or hardening time.

The molding of articles from materials particularly molding relatively large articles of a hardenable plastic material which may also include glass fiber reinforcement is customarily accomplished by means of heated dies in a press, usually hydraulically operated. According to conventional practice the charge of plastic material is placed in the lower die member of the press after which the upper ram of the press is caused to descend to bring the upper and lower die members together and subject the charge to heat and pressure. In accordance with some plastic molding practices, it was necessary to maintain the press closed for a substantial interval of time in order to bring the plastic charge up to temperature and thereafter to hold the material at the desired pressure and temperature of sufficient time to carry forward and complete the curing process thereof. During this period of time required to perform the molding operation with the press closed, not only is the press completely idle but also the press operator and the other workmen engaged in serving the press. In conventional methods, when taking into consideration the high cost of hydraulic presses used for these purposes, the cost of maintenance thereof, the long periods of idleness of the presses and the operators while waiting for the plastic materials to progress through the reaction stages, and the cost of plant space occupied by these presses, it will be apparent that production cost of the plastic articles are greaterly enhanced on account of these conditions.

To improve on the period of time required for the press to hold the dies in the closed position for completely curing the plastic material and making articles there has been developed a process and apparatus for using a single molding press with a plurality of individual latching molds which can be sequentially fed into and removed from the molding press. That is, a molding system utilizing a continuous process in which a plurality of latchable molds are sequentially loaded by the press in their unlatched condition, put under molding pressure, latched, and then conveyed away from the press for further curing period and then at the completion of curing the material the latched mold is unlatched and opened, the article removed, and the latchable mold returned for subsequent use again by introduction into the molding press. Such molding process and apparatus is described in U.S. Pat. No. 2,485,452 and 3,809,739. In U.S. Pat. No. 2,485,452 the mold units are fed in succession into and out of the press and each unit remains in the press for an interval of time during which the preliminary pressing and heating of the plastic material is carried out. Also during this interval of time the mold unit is in the press the unit may be relieved from the pressure of the press ram so as to permit breathing or escape of gases after which final pressure is applied by the press ram so as to fully close the mold and enable it to be clamped tightly in closed position for withdrawal from the press. After removing the mold unit from the press it is maintained locked until final reaction of the plastic material, and then proceeds to the final stage whereupon the mold unit may be unlocked and the molded plastic article removed. It will be noted that in U.S. Pat. No. 2,485,452 the venting of gases takes place while the mold unit is still in the press, thus tying up the press during that venting period of time. With regard to U.S. Pat. No. 3,809,739 there is described therein a molding system that utilizes a continuous process in which the latchable mold assemblies are sequentially loaded by the press, latched, put under additional molding press by an expandable device such as a pneumatic bag, and are then conveyed away from the press, during the curing period, to an unloading station where, after unloading, they are returned to the press for subsequent use. This molding process and equipment requires substantial additional apparatus in order to have a fluid supply and vent connected to the interior of the pneumatic bag and to a fluid pressure supply and controls which are operated to supply fluid under pressure to the bag and to vent the bag for deflation thereof.

By this invention, there is provided process and apparatus that allows for high speed molding of articles without typing up a molding press for a substantial period of time by utilizing a mold assembly that will have the pressure applied by a press and the assembly locked and removed from the press for further curing under correct pressure, temperature and time and which compensates for exhausting gases and shrinkage of the material during the initial curing process without the need of a separate pneumatic bag with its attendant equipment necessary to pressurize the bag and then vent the bag after completion of the curing process.

SUMMARY OF THE INVENTION

There is provided a process and apparatus for molding a plurality of articles of hardenable material such as plastic which requires each article to be maintained under heat and pressure for a cure interval. A molding press has placed therein an open mold assembly having spaced apart die halves between supporting mold platens with at least one of said die halves having a resilient pressure pad between the die and mold platen supporting the die half. The press is closed to maintain the mold platens to close the mold platens in a first force applying position having a slight gap between the die halves and locking the platens in the first position. The mold assembly is removed from the press in its first locked position and the material is subjected to elevated temperatures while gases from the curing material may be evacuated through the gap between the die halves. The mold assembly in its first locked position is again placed in the press and the press closed to unlock the mold assembly and apply and maintain a second molding force greater than the first molding force and sufficient to completely close the die halves to a second position for curing the material and compress the resilient pressure pad. The mold platens are locked in the second position whereby the pressure pad will apply internal forces against the dies to maintain the correct curing pressure in the event of shrinkage of the cured material. The mold assembly is removed from the press in its second locked position and the material is cured under pressure and at elevated temperatures for the correct time interval to form the article whereupon the mold assembly is unlocked and the article is removed therefrom.

BRIEF DESCRIPTION OF THE DRAWINGS

FIG. 4 is a top plan view with sections broken away taken along lines 4—4 of FIG. 3.

DESCRIPTION OF THE PREFERRED EMBODIMENT

Figure 1:
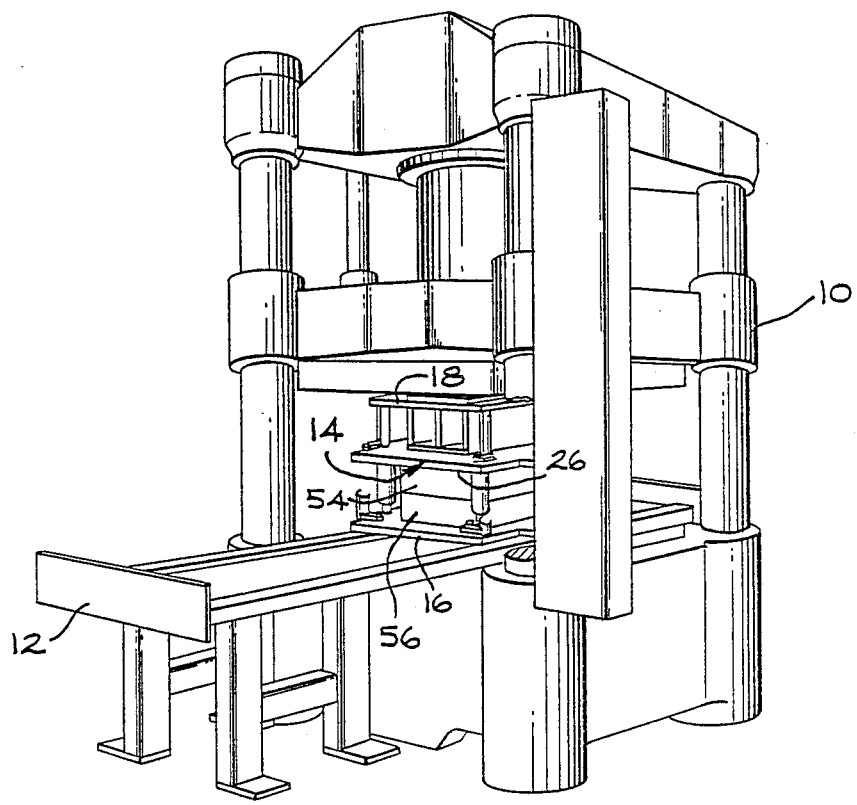
FIG. 1 is a general perspective view of the molding press having therein the mold assembly of the present invention.

Referring first to FIG. 1, an apparatus is illustrated in an embodiment which includes a single molding press 10 which is usually positioned between a loading area and an unloading area with a horizontally extending transfer mechanism 12 through the bed of the press. The molding press is of the usual type that has a vertical upper movable ram which is moved by any suitable means such as gear or hydraulic means to apply pressure between the upper ram and the lower base upon closing of the press. Shown in the molding press 10 in its open position is a molding assembly 14 which is placed in the open press in any convenient manner such as by an automatic transfer mechanism or manually so that the molding assembly 14 may be introduced into the press and after subsequent operation of the press as hereinafter described the molding assembly 14 may be removed from the press after the press is opened. It will be understood that these molding presses may be either manually controlled or they may be automatically controlled such as by a programmable controller which coupled with an automatic transfer system can operate the entire process automatically if so desired.

Figure 2:
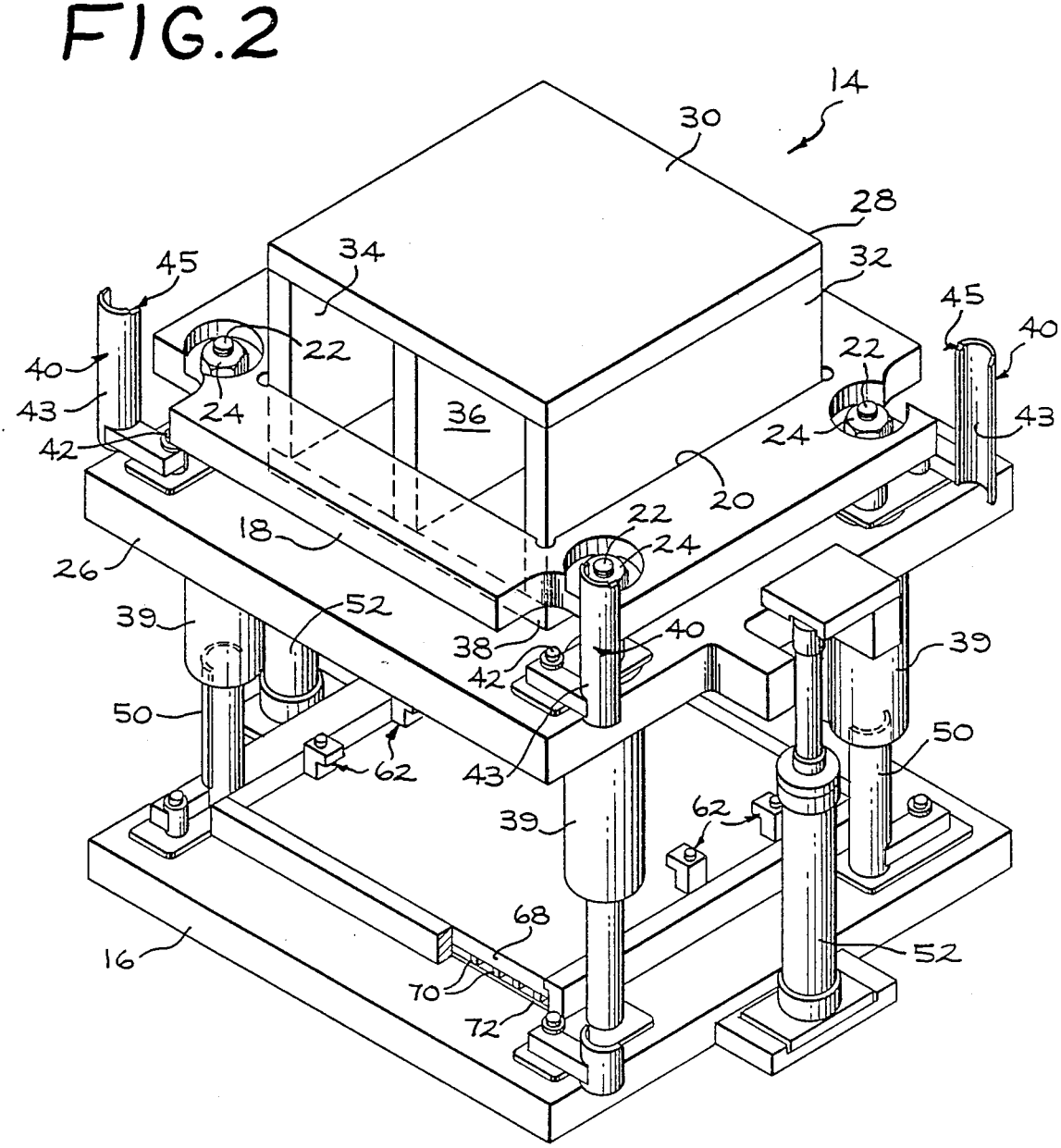
FIG. 2 is a perspective view of the mold assembly of the present invention shown in its open position.
Figure 3:
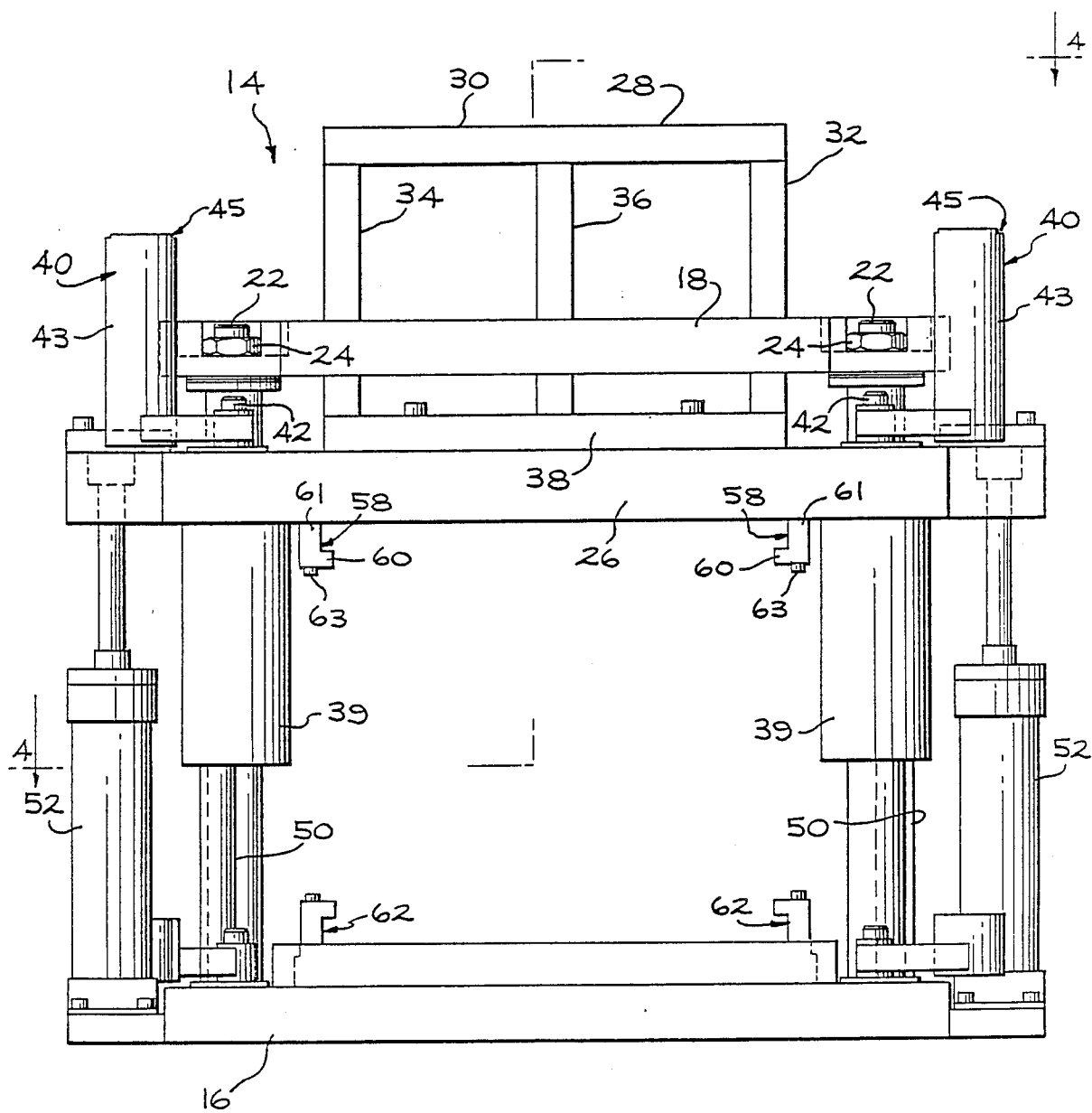
FIG. 3 is a side elevational view of the mold assembly shown in FIG. 2 in its open position.

With reference particularly to FIGS. 2-4, the mold assembly 10 will now be described. The mold fixture or mold assembly 14 has a stationary base platen 16, a top stationary platen 18 which is vertically spaced above the base platen and has therein a large rectangular opening 20, the top platen 18 is secured to the base platen 16 by tie bars 22 and nuts 24 so that the distance between the top platen and the base platen remains fixed. Located between the stationary top platen 18 and the base platen 16 is a travel platen 26 which is movable upwardly and downwardly relative to the top platen 18 and base platen 16. The travel platen 26 has attached to it at the top thereof by any suitable means, such as welding, a push down box 28 which has its outside dimensions slightly smaller than the dimensions of the rectangular opening 20 in the top platen 18 so that the push down box may be moved upwardly and downwardly within the rectangular opening 20. The push down box has a top wall 30, two side walls 32 and 34, an intermediate wall 36, and a bottom wall 38 which is secured to the travel platen 26. The upper ram of the molding press 10 will engage the top wall 30 of the push down box so that exerting downward force on the push down box it and the travel platen 26 will move downwardly in unison. The travel platen 26 has secured to it cylindrical guide members 39 that surround the tie bars 22 at each corner of the travel platen and they move up and down in unison with the travel platen.

Figure 6:
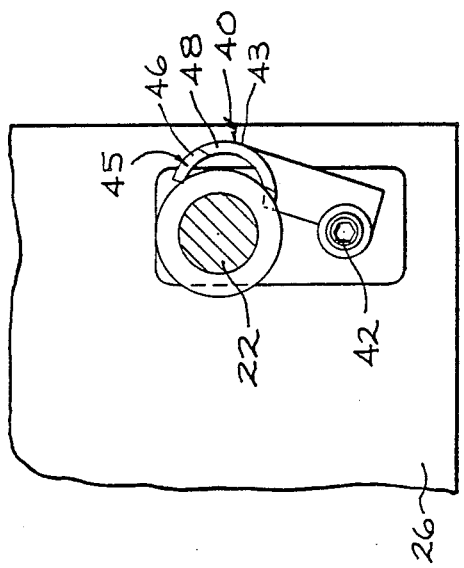
FIG. 6 is a fragmental view of the lock mechanism taken along lines 6—6 of FIG. 5.

The mold assembly 10 also includes, preferably at all four corners of the travel platen 26, locking and unlocking means such as pivotally attached double position locks all designated 40 herein. These locks may pivot about bolts 42 secured to travel platen 26 to swing the lock inwardly underneath the stationary top platen 18. Double position lock means that as best seen in FIG. 6 there is a cut out section 45 of the semi-circular body 43 at the upper end such that by partially swinging the double position lock 40 inwardly to a first position the shoulder 46 formed by the cut out section 45 will be wedged between the top platen 18 and the travel platen 26. If the double positionlock 40 is swung completely inwardly, then the top platen 18 will rest on the terminal end wall 48 of the lock body 43. Thus, if the double position lock 40 has the top platen 18 resting on the shoulder 46 of the locks 40, the distance between top platen 18 and travel platen 26 will be less than if the top platen 18 rests on the terminal end wall 48 of the locks. It will be understood that these locks may be pivotally moved either manually, mechanically or electromechanically in response to appropriate control signals. The preferred embodiment of the locks show one configuration; however, the locks may be structurally different as long as they perform the same function as the double position locks 40 do.

Located between the base platen 16 and travel platen 26 and pivotally secured to the base platen 16 are safety support 50 positioned at diagonal corners of the base platen and these pivotal safety supports are utilized to hold the travel platen 26 in its fully up position relative to the base platen 16 in the event it is necessary for persons to work safely on the interior of the mold assembly 14. There are also means to raise the travel platen 26 to its upper position as shown in FIGS. 2 and 3. In the preferred embodiment there is shown jacks or return cylinders 52 two of which are located at opposite sides of the mold assembly for such purpose.

Figure 5:
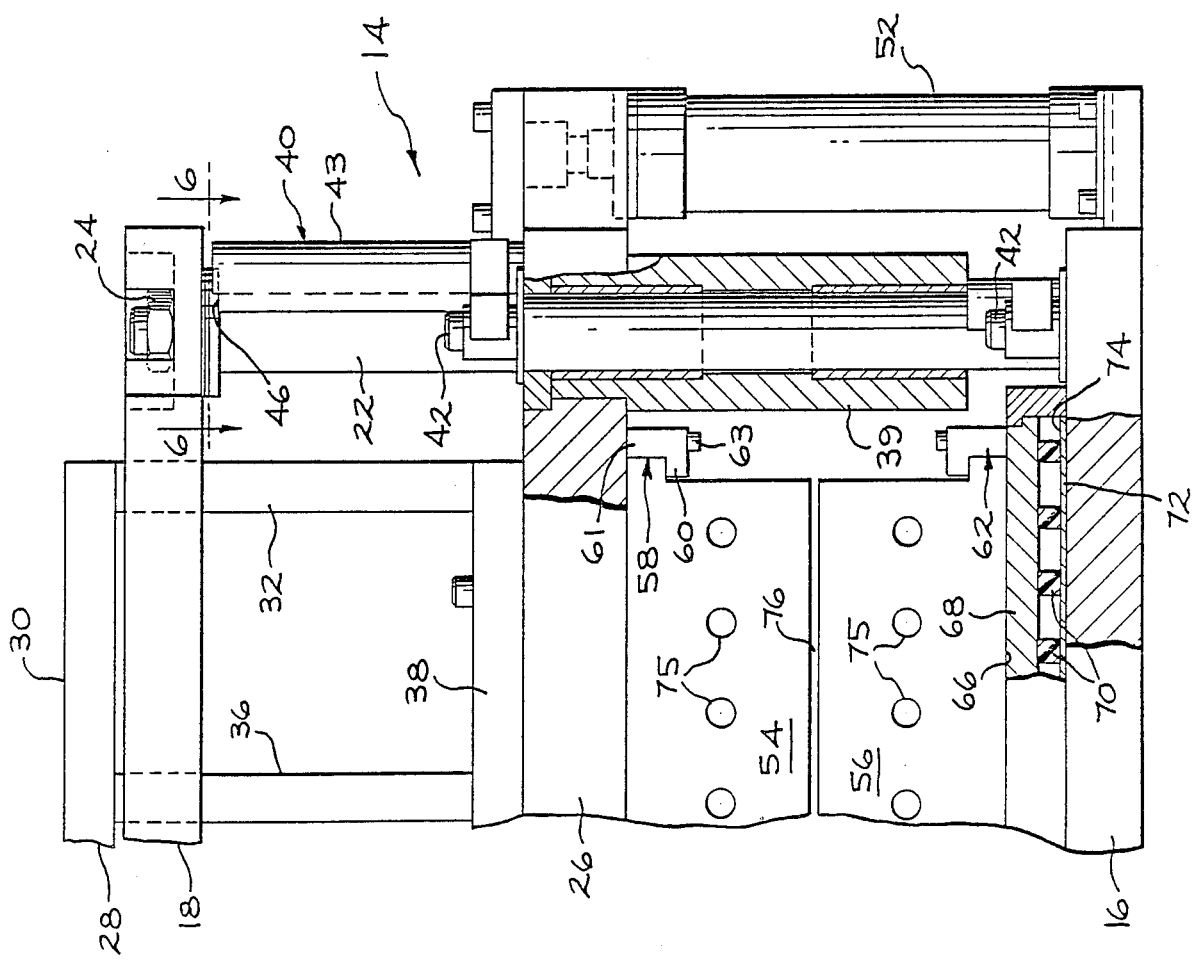
FIG. 5 is a partial view of the mold assembly of the present invention showing the first locked position with a gap between the die halves.

There is secured to the inside of the mold assembly two die halves as shown in FIGS. 5 and 6, an upper die half 54 and a bottom die half 56 which in accordance with usual plastic molding dies has within the opposing surfaces a die pattern suitable for molding the intended plastic article. The upper die half 54 is retained secured to the travel platen 26 by die retainers 58 which are L-shaped, having one leg 60 of the L secured to the die 54 and the other leg 61 bolted to the travel platen 26 by bolts 63. In like manner, the bottom die half 56 is secured to the base platen 16 by die retainer members 62 so that upon closing of the upper die half and bottom die half the dies will match and the article to be molded may be satisfactorily defined in the die cavities. Located below the bottom surface 66 of bottom die half 56 is a mounting plate 68 and below the mounting plate 68 is a series of elongated resilient pressure pads 70 made of suitable elastomeric material, such as silicon rubber, which rest on a relatively thin plate 72 which acts as a spacer between the resilient pressure pad 70 and the top face 74 of the base platen 16. The molding process requires the material to be cured while in the dies by heating at elevated temperatures while under pressure and for that purpose one such heating arrangement is to insert electric resistance heaters 75 into the die halves 54 and 56 in close proximity to the material in the die cavity for good heat transfer capabilities. As is a common practice a transit sheet of insulating material (not shown) may be inserted between the die half 54 and travel platen 26 and die half 56 and mounting plate 68 to minimize heat transfer from the die halves.

Figure 7:
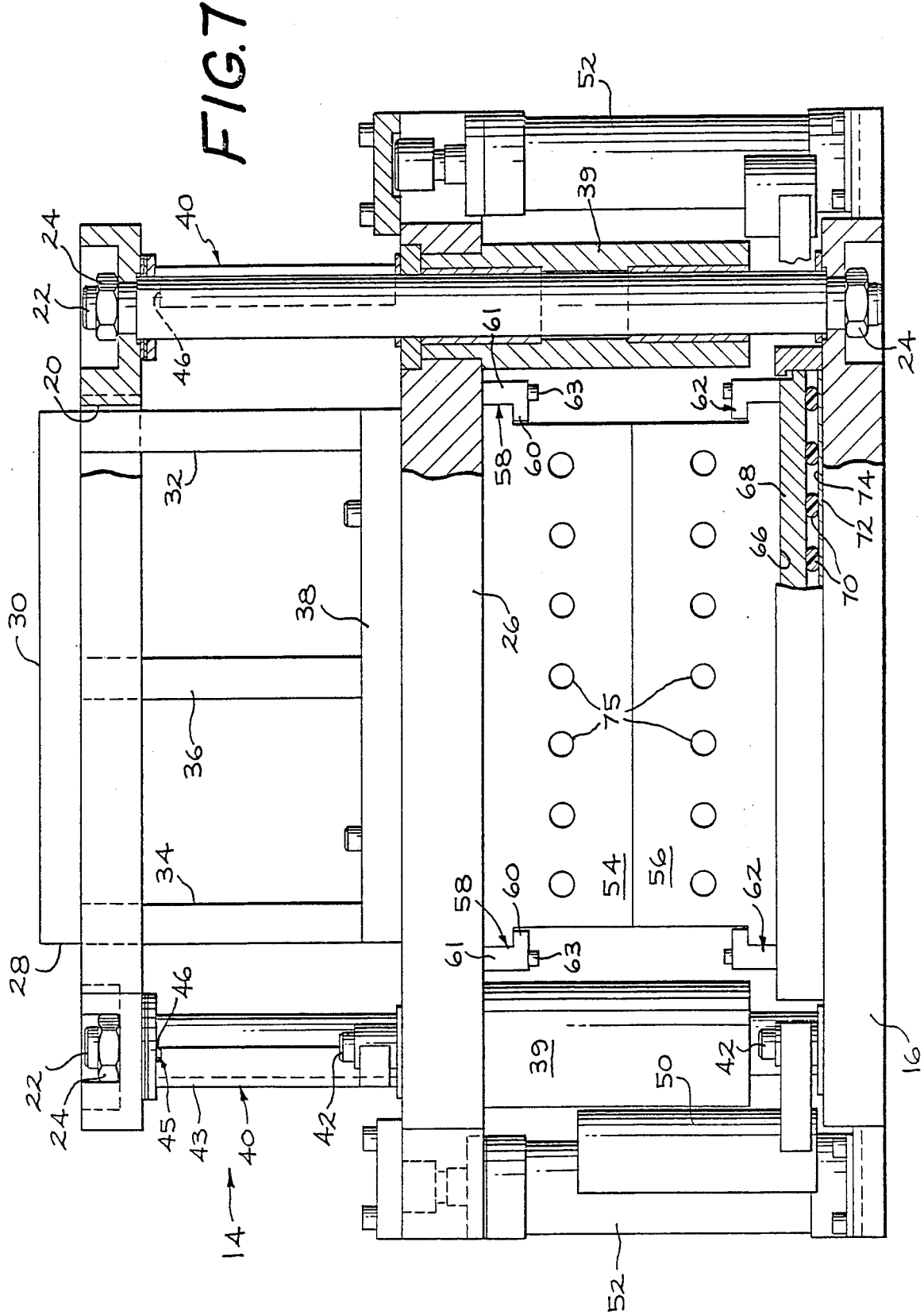
FIG. 7 is similar to FIG. 5 wherein the mold assembly is shown in side elevation and partially in section with the die halves in the second fully closed position.

With the above described apparatus the process for molding a plurality of articles of hardenable material such as plastic material incorporating fiberglass reinforcement which requires each article to be maintained under pressure and at elevated temperatures for a cure interval is accomplished by placing the mold assembly 14 which includes the die halves 54 and 56 in an open position within the molding press 10 such that the molding press upper ram may engage top wall 30 of the push down box 28 as shown in FIG. 1. The bottom of the press supports the stationary base platen 16. The mold assembly 14 would therefore appear as shown in FIG. 2 but also including the two die halves 54 and 56. The die halves are charged with plastic molding material by placing the material within the die cavity and the molding press 10 then is closed until the pushdown box and travel platen 26 to which it is secured moves downwardly carrying with it the upper die half 50 and reaches the first mold assembly force applying position shown in FIG. 5 to maintain a first molding force on the mold platens 26 and 16 with a slight gap 76 between the die halves. In this position the double position locks 40 are moved partially inwardly to have the shoulders 46 of the cut out sections 45 of the lock bodies 43 engage the bottom surface of top platen 18. With these locks 40 in this first position wedged between the travel platen 26 and top platen 18 the travel platen 26 is held to a fixed position relative to the base platen 16 during the initial curing of the plastic material within the cavities of the dies. During this initial curing time the gases evolving from the curing process may be evacuated through the gap 76 between the die halves. Once the first molding force on the mold platens is achieved to move the mold platens to a first position having the slight gap between the die halves and the locking takes place the mold assembly 14 may be removed from the molding press 10 and stored until sufficient time has elapsed that the curing material has evolved the gases and evacuated them from the gap whereupon the mold assembly 14 is placed back in the open molding press 10 for a second molding force to be applied to the push down box and travel platen 26. The molding press is then closed to the first force applying position to allow the locks 40 to be pivotally moved outwardly from under the top platen 18 and then the press applies and maintains a second molding force greater than the first molding force and sufficient to completely close the die halves to a second position for curing the material and compress the resilient pressure pad 70. It will be understood that there may be, if need be, several intermediate force applying operations applied to the molding assembly between the first force applying position to achieve the second mold assembly position for curing the material. This second position is for curing the material shown in FIG. 7. The mold platens are locked in the second position and that is achieved by pivoting the double position locks 40 completely inwardly so that they are wedged between the travel platen 26 and the top stationary platen 18 with the terminal end wall 48 of the lock bodies 43 in contact with the top stationary platen 18. While the molding process has been described in terms of manual operations it is to be understood that the sequence of steps and operation of the functions to be performed may, if desired, be controlled by a programmable controller or other electrical control equipment with attendant equipment to accomplish the same desirable results.

With the mold platen in the second locked position the mold assembly may be removed from the molding press and stored while the plastic material is being treated under pressure at elevated temperatures within the mold assembly for a time interval sufficient to cure the material and form the part. After the curing period the mold assembly may be unlocked such as by placing it in the press and exerting force on it to allow the locks to be pivoted outwardly from between the travel platen 26 and top stationary platen 18 and the travel platen 26 is moved upwardly by return means such as cylinders 50 carrying with it the upper die 54. The safety supports 50 are pivotally moved inwardly under the travel platen 26 thus allowing safe access and removal of the molded part from within the die cavity. The mold assembly 14 is shown in this position in FIGS. 3 and 4. In FIG. 4 one of the safety supports 50 is in its inward position in engagement with tie bar 22 and the other is in its outward position ready to be pivotally moved inwardly.

While there has been shown and described a process and a specific embodiment of the invention, it will be understood that it is not limited thereto and it is intended by the appended claims to cover all such modifications as fall within the true spirit and scope of the invention.

What is claimed is:

1. A process for molding a plurality of articles of hardenable material which requires each article to be maintained under heat and pressure for a cure interval comprising the steps of:

placing in a molding press a first open mold assembly having spaced apart die halves between supporting mold platens, placing a resilient pressure pad between at least one die half and the mold platen supporting said die half, closing the press and maintaining the mold platens in a first force applying position having a slight gap between the die halves and locking the platens in said first position, removing the mold assembly in its first locked position from the press and evacuating gases from the curing material through the gap between the die halves while heating the material, placing the mold assembly in its first locked position in the press and unlocking the mold assembly, closing the press to apply and maintain a second molding force greater than the first molding force and sufficient to completely close the die halves to a second position for curing the material and compress the resilient pressure pad, locking the mold platens in said second position, whereby the pressure pad will apply internal forces against the dies to maintain the correct curing pressure in the event of shrinkage of the cured material, removing the mold assembly in its second locked position from the press and curing the material at the correct temperature and time interval to form the article, and unlocking the mold assembly and removing the cured article therefrom.

2. The process for molding a plurality of articles of hardenable material according to claim 1 wherein heating the material is by electrical resistance heaters in the die halves.

3. The process for molding a plurality of articles of hardenable material according to claim 1 wherein the step of unlocking the mold assembly is by placing the mold assembly in the press and applying sufficient pressure to the mold assembly to enable unlocking the mold assembly.

* * * * *